US008090639B2

(12) United States Patent
Seaman et al.

(10) Patent No.: US 8,090,639 B2
(45) Date of Patent: Jan. 3, 2012

(54) METHOD AND SYSTEM FOR CREATING AND MARKETING EMPLOYEE STOCK OPTION MIRROR IMAGE WARRANTS

(75) Inventors: David A. Seaman, Short Hills, NJ (US); Santosh V. Nabar, Englewood, NJ (US); Mark J. Zanoli, San Francisco, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 127 days.

(21) Appl. No.: 12/696,852

(22) Filed: Jan. 29, 2010

(65) Prior Publication Data

US 2010/0138332 A1     Jun. 3, 2010

Related U.S. Application Data

(62) Division of application No. 11/179,861, filed on Jul. 12, 2005, now Pat. No. 7,693,770.

(60) Provisional application No. 60/599,629, filed on Aug. 6, 2004, provisional application No. 60/642,041, filed on Jan. 7, 2005.

(51) Int. Cl.
*G06Q 40/00* (2006.01)
(52) U.S. Cl. ........................ 705/36 R; 705/35
(58) Field of Classification Search .................... 705/37, 705/36 R, 35, 38, 1.1, 7, 36 T, 30, 26.1, 10, 705/14.1, 2, 11, 40; 235/379, 380; 435/4; 433/213, 24
See application file for complete search history.

(56) References Cited

U.S. PATENT DOCUMENTS

| | | | |
|---|---|---|---|
| 4,169,285 | A | 9/1979 | Walker |
| 4,648,038 | A | 3/1987 | Roberts et al. |
| 4,739,478 | A | 4/1988 | Roberts et al. |
| 4,742,457 | A | 5/1988 | Leon et al. |
| 4,752,877 | A | 6/1988 | Roberts et al. |
| 4,933,842 | A | 6/1990 | Durbinet et al. |
| 5,121,469 | A | 6/1992 | Richards et al. |

(Continued)

FOREIGN PATENT DOCUMENTS

WO     98/43170     10/1998

(Continued)

OTHER PUBLICATIONS

Levey, Steven I. "Basic analysis software provides financial planning tool kit. (Software Review)."Mar. 18, 2002 Accounting Today, 16(5):P21(4).*

(Continued)

*Primary Examiner* — Kelly Campen
(74) *Attorney, Agent, or Firm* — Lowenstein Sandler, P.C.

(57) ABSTRACT

A warrant on company stock that is used to determine value of employee options for U.S. accounting purposes on company stock. The warrant comprises an amortization factor, an exercise term that is the same or substantially similar to an exercise term of the employee options, and a strike price that is the same or substantially similar to a strike price of the employee options. The warrant also comprises a provision to periodically determine the amortization factor based on early forfeiture and/or early exercise of the employee options, a provision to apply the amortization factor to the warrants; and a provision to determine an intrinsic value of the warrants. Value of the employee options for U.S. accounting purposes is determined using market value of the warrants at issue.

21 Claims, 5 Drawing Sheets

U.S. PATENT DOCUMENTS

| | | | |
|---|---|---|---|
| 5,222,019 A | 6/1993 | Yoshino et al. |
| 5,257,369 A | 10/1993 | Skeen et al. |
| 5,270,922 A | 12/1993 | Higgins |
| 5,297,031 A | 3/1994 | Gutterman et al. |
| 5,297,032 A | 3/1994 | Trojan et al. |
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,689,650 A | 11/1997 | McClelland et al. |
| 5,706,502 A | 1/1998 | Foley et al. |
| 5,710,889 A | 1/1998 | Clark et al. |
| 5,724,593 A | 3/1998 | Hargrave, III et al. |
| 5,742,775 A | 4/1998 | King |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,878,404 A | 3/1999 | Stout et al. |
| 5,880,725 A | 3/1999 | Southgate |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,926,792 A | 7/1999 | Koppes et al. |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,966,700 A | 10/1999 | Gould et al. |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makavic |
| 6,064,984 A | 5/2000 | Ferguson et al. |
| 6,070,151 A | 5/2000 | Frankel |
| 6,073,104 A | 6/2000 | Field |
| 6,073,109 A | 6/2000 | Flores et al. |
| 6,073,115 A | 6/2000 | Marshall |
| 6,078,903 A | 6/2000 | Kealhofer |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,098,122 A * | 8/2000 | Emmes et al. ............ 710/29 |
| 6,105,005 A | 8/2000 | Fuhrer |
| 6,125,355 A * | 9/2000 | Bekaert et al. .......... 705/36 R |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,269,346 B1 | 7/2001 | Cristofich et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,567,790 B1 | 5/2003 | Slane |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 6,711,554 B1 | 3/2004 | Salzmann et al. |
| 7,191,392 B1 | 3/2007 | Coar |
| 7,212,993 B1 | 5/2007 | Bodurtha et al. |
| 7,222,094 B2 | 5/2007 | Ross |
| 7,233,921 B2 | 6/2007 | Takeda et al. |
| 7,249,037 B2 | 7/2007 | Koppes et al. |
| 7,249,075 B1 | 7/2007 | Altomare et al. |
| 7,249,077 B2 | 7/2007 | Williams et al. |
| 7,249,095 B2 | 7/2007 | Davies et al. |
| 7,272,580 B2 | 9/2007 | Brady et al. |

| | | |
|---|---|---|
| 7,313,541 B2 | 12/2007 | Wise et al. |
| 7,337,141 B2 | 2/2008 | Sullivan et al. |
| 7,353,200 B1 | 4/2008 | Brumberg |
| 7,392,210 B1 | 6/2008 | MacKay et al. |
| 7,392,212 B2 | 6/2008 | Hancock et al. |
| 7,590,580 B2 | 9/2009 | Spivey |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0025264 A1 | 9/2001 | Deaddio et al. |
| 2001/0032217 A1 | 10/2001 | Huang |
| 2001/0037277 A1* | 11/2001 | Willis et al. ............ 705/36 |
| 2001/0042034 A1 | 11/2001 | Elliott |
| 2001/0043235 A1 | 11/2001 | Best et al. |
| 2001/0044770 A1 | 11/2001 | Keith |
| 2001/0044771 A1 | 11/2001 | Usher et al. |
| 2001/0047295 A1* | 11/2001 | Tenembaum ............ 705/14 |
| 2001/0047320 A1* | 11/2001 | Meder ............ 705/36 |
| 2001/0056391 A1 | 12/2001 | Schultz |
| 2001/0056397 A1 | 12/2001 | Kelly et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0010663 A1 | 1/2002 | Muller |
| 2002/0013753 A1 | 1/2002 | Marks de Chabris et al. |
| 2002/0013862 A1 | 1/2002 | Orchard et al. |
| 2002/0016762 A1 | 2/2002 | Felibogen et al. |
| 2002/0016819 A1 | 2/2002 | Sugimoto et al. |
| 2002/0018077 A1 | 2/2002 | Powlette |
| 2002/0019805 A1 | 2/2002 | Kalotay |
| 2002/0022956 A1 | 2/2002 | Ukranincsyk et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032636 A1 | 3/2002 | Shields et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0042771 A1 | 4/2002 | Shields et al. |
| 2002/0046154 A1 | 4/2002 | Pritchard |
| 2002/0046158 A1 | 4/2002 | Kelly et al. |
| 2002/0049665 A1 | 4/2002 | Solomon et al. |
| 2002/0049666 A1 | 4/2002 | Reuter et al. |
| 2002/0054115 A1 | 5/2002 | Mack et al. |
| 2002/0059129 A1 | 5/2002 | Kemp, II et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087391 A1 | 7/2002 | Williams |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0091991 A1* | 7/2002 | Castro ............ 717/106 |
| 2002/0099646 A1 | 7/2002 | Agarwal et al. |
| 2002/0099656 A1 | 7/2002 | Poh Wong |
| 2002/0101120 A1 | 8/2002 | Akama et al. |
| 2002/0107774 A1 | 8/2002 | Henninger et al. |
| 2002/0112056 A1 | 8/2002 | Baldwin et al. |
| 2002/0116310 A1 | 8/2002 | Cohen et al. |
| 2002/0123947 A1 | 9/2002 | Yuste et al. |
| 2002/0130868 A1 | 9/2002 | Smith |
| 2002/0133456 A1 | 9/2002 | Lancaster et al. |
| 2002/0138390 A1 | 9/2002 | May |
| 2002/0143673 A1 | 10/2002 | Hitchings et al. |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0156719 A1 | 10/2002 | Finebaum et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0172349 A1 | 11/2002 | Shea |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2002/0194136 A1 | 12/2002 | Sullivan et al. |
| 2002/0198804 A1 | 12/2002 | Calvin |
| 2002/0198808 A1 | 12/2002 | Myers |
| 2002/0198818 A1 | 12/2002 | Scott et al. |
| 2002/0198833 A1 | 12/2002 | Wohlstadter |
| 2003/0004942 A1 | 1/2003 | Bird |
| 2003/0009406 A1 | 1/2003 | Ross |
| 2003/0009411 A1 | 1/2003 | Ram et al. |
| 2003/0018558 A1 | 1/2003 | Heffner et al. |
| 2003/0018714 A1 | 1/2003 | Mikhailov et al. |
| 2003/0028456 A1 | 2/2003 | Yolles |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0083975 A1 | 5/2003 | O'Grady et al. |
| 2003/0088496 A1 | 5/2003 | Potrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105806 A1 | 6/2003 | Gayle et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0154158 A1 | 8/2003 | Martyn et al. |
| 2003/0154306 A1 | 8/2003 | Perry |
| 2003/0158949 A1 | 8/2003 | Miller et al. |
| 2003/0163401 A1 | 8/2003 | Dines et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0229718 A1 | 12/2003 | Tock et al. |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0039666 A1 | 2/2004 | Fudali et al. |
| 2004/0039692 A1 | 2/2004 | Shields et al. |
| 2004/0064397 A1 | 4/2004 | Lynn et al. |
| 2004/0068559 A1 | 4/2004 | Shaw |
| 2004/0078248 A1 | 4/2004 | Altschuler |
| 2004/0103003 A1 | 5/2004 | Mayers et al. |
| 2004/0128169 A1 | 7/2004 | Lusen |
| 2004/0138982 A1 | 7/2004 | Lawrence |
| 2004/0148247 A1 | 7/2004 | Miller et al. |
| 2004/0148259 A1 | 7/2004 | Reiners et al. |
| 2004/0162775 A1 | 8/2004 | Winklevoss et al. |
| 2004/0167850 A1 | 8/2004 | Dreyer et al. |
| 2004/0172349 A1 | 9/2004 | Quinn et al. |
| 2004/0193536 A1 | 9/2004 | Marlowe-Noren |
| 2004/0199449 A1* | 10/2004 | Rudkin ............ 705/36 |
| 2004/0215553 A1 | 10/2004 | Gang et al. |
| 2004/0220885 A1 | 11/2004 | Salzmann et al. |
| 2004/0225536 A1 | 11/2004 | Schoen et al. |
| 2004/0225596 A1 | 11/2004 | Kemper et al. |
| 2005/0004854 A1 | 1/2005 | Jones et al. |
| 2005/0010517 A1 | 1/2005 | Lowenstein et al. |
| 2005/0027646 A1 | 2/2005 | Hall et al. |
| 2005/0060256 A1 | 3/2005 | Peterson et al. |
| 2005/0071265 A1 | 3/2005 | Nishimaki |
| 2005/0086148 A1 | 4/2005 | Woodruff et al. |
| 2005/0086170 A1 | 4/2005 | Rao |
| 2005/0102213 A1 | 5/2005 | Savasoglu et al. |
| 2005/0102214 A1 | 5/2005 | Speth et al. |

| | | | |
|---|---|---|---|
| 2005/0108118 | A1 | 5/2005 | Malackowski et al. |
| 2005/0154751 | A1 | 7/2005 | Levi et al. |
| 2005/0160027 | A1* | 7/2005 | Thomas ............................ 705/37 |
| 2005/0216384 | A1 | 9/2005 | Partlow et al. |
| 2005/0216387 | A1 | 9/2005 | Barany et al. |
| 2005/0240510 | A1 | 10/2005 | Schweickert et al. |
| 2006/0155621 | A1 | 7/2006 | Bell |
| 2006/0229973 | A1 | 10/2006 | Sternberg |
| 2006/0259419 | A1 | 11/2006 | Monsen et al. |
| 2007/0005478 | A1 | 1/2007 | Lambe |
| 2007/0043654 | A1 | 2/2007 | Libman |
| 2008/0071667 | A1 | 3/2008 | Himmelstein |
| 2008/0109386 | A1* | 5/2008 | Thomas ......................... 705/400 |
| 2009/0138392 | A1* | 5/2009 | Thomas ........................... 705/35 |

FOREIGN PATENT DOCUMENTS

| | | |
|---|---|---|
| WO | 01/20530 | 3/2001 |
| WO | 01/37540 | 5/2001 |
| WO | 01/57716 | 8/2001 |
| WO | 01/59670 | 8/2001 |
| WO | 02/03774 | 1/2002 |
| WO | 02/14991 | 2/2002 |
| WO | 02/054189 | 7/2002 |
| WO | 02/056146 | 7/2002 |
| WO | 02/063516 | 8/2002 |
| WO | 02/065278 | 8/2002 |
| WO | 02/065286 | 8/2002 |
| WO | 03/012588 | 2/2003 |
| WO | 03/030013 | 4/2003 |
| WO | 03/032158 | 4/2003 |
| WO | 03/065256 | 8/2003 |
| WO | 03/102733 | 12/2003 |

OTHER PUBLICATIONS

Anonymous "Lee Enterprises Reports Q3 Earnings. " Jul. 21, 2003, Business Wire.*

Anonymous "Ligand Announces Preliminary Revenue Estimates For Third Quarter of Fiscal 2005, Preliminary Results for First and Second Quarters of Fiscal 2005 and Filing of 10-K and Audited Results for Fiscal 2004, 2003, and 2002." Nov. 18, 2005, Business Wire.*

Berthier Ribeiro-Neto et al, Top-Down Extraction of Semi-Structured Data, String Processing and Information Retrieval Symposium, 1999 and Int'l Workshop on Groupware, pp. 176-183 (Sep. 24, 1999).

Bill Martin, Interview: Cormac L Kinney, Chairman and Co-Founder, NeoVision, eFinance Insider, Aug. 16, 2001, http://www.efinanceinsider.com/email81601 (last visited Aug. 2, 2005).

Commodity Futures Trading Commission, CFTC Glossary ("Co"), A Guide to the Language of the Futures Industry, http://www.cftc.gov/educationcenter/glossary/glossary_co.html (last visited Nov. 18, 2008).

Czejdo et al, Automatic generation of ontology based annotations in XML and their use in retrieval systems, Proc 1st Int'l Conf. on Web Information Systems Engineering, vol. 1 pp. 296-300 (Jun. 21, 2000) (Abstract).

David Elkayam et al, Using Indexed Bonds to Estimate a Central Bank Reaction Function (Apr. 11, 2002).

David Pilla, In case of emergency; contingent capital, Best's Rev., vol. 102, p. 59 (Sep. 1, 2001).

Freddie Mac, Document Custody Procedure Overview (Dec. 2003).

Gary W. Emery et al, The Measurement of Liquidity, 20 J. Acct. Res. 290 (1982).

George Chacko et al, Cephalon, Inc. taking risk management theory seriously, 60 J. Fin. Econ. 2 (May 2001).

Giuseppe Manco et al, A framework for adaptive mail classification, Proc. 14th Int'l Conf. on Tools with Artificial Intelligence, pp. 387-392 (Nov. 6, 2002) (Abstract).

Helen Huntley, Class B Mutual Fund Shares Face Increasing Scrutiny, St. Petersburg Times, Feb. 6, 2005, at 1D.

Henry Kus, Contingent capital: just in time capital management sets a new standard, Corporate Finance, p. 30 (Oct. 1, 2002).

Hewlett-Packard, x4queview, Mar. 1992.

Ian H. Witten et al, Text mining: a new frontier for lossless compression, Proc. Data Compression Conf., pp. 198-207 (Mar. 31, 1999) (Abstract).

IBM Corp., Strict Read Order Control for a Queing System, IBM Technical Disclosure Bulletin, Mar. 2002.

Investing Systems Network, Recommended Software, http://www.investing-systems.com/software.html (last visited Oct. 21, 2002).

Inxight Software, Inc., Intelliseek and Inxight Partner to Provide New Business Intelligence Solutions, http://www.inxight.com/news/021029_intelliseek.html (last visited Nov. 2002).

Jim Ericson, Softwerc releases patent-pending "URL Generator" for distribution of Web-based content, applications, http://www.portalsmag.com/articles/default.asp?ArticleID=4191 (Nov. 15, 2002).

Jussi Myllymaki, Effective Web Data Extraction with Standard XML Technologies, http://www10.org/cdrom/papers/102 (May 5, 2001).

Lencom, Fast Email Extractor 4.4, http://www.lencom.com/FEE.html (last visited Sep. 2003).

Ming Fan et al, The Internet and the Future of Financial Markets; Industry Trend or Event, 43 Comm. ACM 82 (Nov. 1, 2000).

National Association of Securities Dealers, NASD Investor Alert, Class B Mutual Fund Shares: Do They Make the Grade?, Jun. 25, 2003, http://web.archive.org/web/20030724111858/www.nasd.com/Investor/Alerts/alert_classb_funds.htm.

Novell, Inc., Beginning of Viewing Information and Viewing Basic Information about a Print Job, 5 Managing Print Queues, Jun. 1, 1993.

Pavel P. Calado et al, The web-DL environment for building digital libraries from the web, Proc. Joint Conf. on Digital Libraries, pp. 346-357 (May 31, 2003) (Abstract).

Rachel Emma Silverman, A New Strategy For Giving Away Your Money, Wall St. J., Oct. 6, 2004, at D1.

Rising to the Challenge of Global STP, Global Investor, Nov. 1999, at 51.

Ron White, How Computers Work 36-37, 267-68, 271 (4th ed. 1998).

Rupali Sharma et al, Phrase-based text representation for managing the Web documents, Proc. 2003 Int'l Conf. Computers and Communications, Information Technology: Coding and Computing Proceedings, pp. 165-169 (Apr. 30, 2003) (Abstract).

Sally Roberts, Top Priority on Bottom Line: More Companies Seeking to Manage Business Risks, Bus. Ins., Mar. 20, 2000, at 3.

Securities Market Practice Group, Block Trades Market Practice (Apr. 2003).

STP in the Bond Market?—Not Yet, But Electronic Initiatives are Gearing Up, Wall St. & Tech., Dec. 1, 2002, at 20.

Sunny K.S. Lam et al, Querying Web data—the WebQA approach, Proc. 3d Int'l Conf. on Web Information Systems Engineering, pp. 139-148 (Dec. 14, 2002) (Abstract).

TradeWeb's STP Vision, Euromoney, Feb. 1, 2003, at S6.

V. Carchiolo et al, Structuring the Web, 11th Int'l Workshop on Database and Expert Systems Applications, p. 1123 (Sep. 8, 2000) (Abstract).

Various Authors, Financial Information eXchange, Gen. Conf. (Oct. 7, 1998).

Wolfgang May, Modeling and querying structure and contents of the Web, Proc. 10th Int'l Workshop on Database and Expert Systems Applications, pp. 721-725 (Sep. 3, 1999) (Abstract).

Levey, Steven I. "Basic Analysis Software Provides Financial Planning Tool Kit (Software Review)." Mar. 18, 2002 Accounting Today, 16(5):P21(4).

Anonymous "Lee Enterprises Reports Q3 Earnings." Jul. 21, 2003, Business Wire.

Anonymous "Ligand Announces Preliminary Revenue Estimates for Third Quarter of Fiscal 2005, Preliminary Results for First and Second Quarters of Fiscal 2005 and Filing of 10-K and Audited Results for Fiscal 2004, 2003, and 2002." Nov. 18, 2005, Business Wire.

Merrill Lynch & Co., Mandalay Resort Group, Floating Rate Convertible Senior Debentures due 2033, Offering Memorandum; Mar. 17, 2003.

Industry Issues Archive; SEC Adopts Proposals Regarding Exchanges and Alternative Trading Systems; http://www.ici.org/issues/mrkt/arc-sec/98_sec_ats_adopt.html; Dec. 28, 1998.

Cowan, Arnold, R., Nayar, Nandkumar, Singh, Ajai K.; How High Are Investment Banking Fees? The Case of Standby Underwritten Convertible Calls; Oct. 1999; http://www.bus.iastate.edu/arnie.

Affiliated Managers Group, Inc.; $200,000,000 Floating Rate High Premium and Warrant Convertible Securities Due 2033; Offering Memorandum; LIBC Feb. 2003.

Merrill Lynch & Co.; $250,000,000 Affiliated Managers Group, Inc. Floating Rate Convertible Senior Debentures Due 2033; Offering Memorandum; Feb. 19, 2003.

Hoadley, Peter; Options Strategy Analysis Tools; http://www.hoadley.net/options/bs.htm.

DerivativesStrategy; Delta Hedging Problems and Solutions; http://www.derivativesstrategy.com/magazine/archive/1998/0398coll.asp.

Hauser, James L., Journal of Compensation and Benefits; The Stock Option Repricing Dilemma; Nov./Dec. 2001.

Financial Accounting Series Statement of Financial Accounting Standards No. 123 (revised 2004), Financial Accounting Standards Board of the Financial Accounting Foundation, No. 263-C Dec. 2004.

Applications of random walkers to Stock Pricing, www.math.mit.edu/stocker/18354.d/financial.pdf; Spring 2004.

Transferable Stock Options: Compensation for the 21st Century, David A. Seaman, Workspan, May 2004, 47(5) pp. 64-71.

Transferable Stock Options: Microsoft's Program, Frederic W. Cook & Co., Inc. Oct. 31, 2003.

Transferable Stock Options (TSOs) and the Coming Revolution in Equity-Based Pay, Brian J. Hall, Journal of Applied Corporate Finance, Winter 2004 16(1).

Statement 133 Implementation Issues, No. A17, FASB, May 1, 2003.

Menachem Brenner, Rangarajan K. Sundaram and David Yermack, Altering the terms of executive stock options, 2000, Journal of Financial and Economics, 57, pp. 103-128.

J. Downes et al., Dictionary of Finance and Investment Terms, 1995, Barron's Educational Series, Inc., Fourth Edition, p. 19.

Agenda Items for the AEG Meetings, Feb. 2004-Nov. 2008 (7 pages).

List of Documents, First meeting of Advisory Expert Group on National Accounts, Washington, D.C., Feb. 16-20, 2004 (2 pages).

Proposal of 2002 OECD National Accounts Experts on Employee Stock Options, pp. 1-11.

Haveman et al., Employee Stock Options Become Transferable, Feb. 2007, Faegre & Benson (5 pages).

CenterPoint Energy Form, Inc.—S-3, as filed with the Securities and Exchange Commission on Apr. 16, 2004, pp. 1-35.

Eurostat, Employee Stock Options Paper for the Advisory Expert Group on national accounts, 2004, pp. 1-15.

Securities and Exchange Commission, Registration of Securities on Form S-8, Final Rule, 1999, pp. 1-74.

The Internal Revenue Service, Stock Based Compensation Audit Techniques Guide, Feb. 2005, pp. 1-6.

Transferable Option Developments—IRS Rules on Transferring Unvested Options, fwcook, Apr. 17, 1998, pp. 1-3.

Bagdonas et al., Managing a Stock Plan Restructuring, Global Equity Conference, 2004, pp. 1-24.

Microsoft Corporation, Form S-3, as filed with Securities and Exchange Commission on Sep. 16, 2003, pp. 1-35.

Microsoft Registration Agreement Exhibit (d)(1) Oct. 9, 2003, pp. 1-34.

Employee Stock Options in the EU and the USA, Final Report, Italy, Aug. 2002, pp. 1-15.

Stock Options Programs, Running a Business—Fact Sheet, ISA, Mar. 2009, pp. 1-3.

Taxation of Tradable Stock Options in Germany, Expatica, The Netherlands, Jul. 26, 2004, pp. 1-2.

Kallunki, Juha-Pekka et al., Should There Exist Secondary Markets for Executive Stock Options?, Accounting and Finance, Abstract, Jun. 2006 (2 pages).

Kallunki, Juha-Pekka et al., Managers' Motives for Selling Executive Stock Options on Secondary Markets: A Study of The Unique Environment of Finland, Current Version: Nov. 5, 2003, pp. 1-35.

Pirjeta, Antti, Helsinki School of Economics, Evaluation of Executive Stock Options in Continuous and Discrete Time, 2009 (189 pages).

Flannery, William et al., Global Equity Organization, From Switzerland to North America: Practical Consideration When Extending Share Plans to the U.S. and Beyond, Novartis Corporation, Fidelity Stock Plan Services 2006 (14 pages).

* cited by examiner

| | 1/1/2008 | 4/1/2008 | 7/1/2008 | 10/1/2008 | 1/1/2009 | 4/1/2009 | 7/1/2009 | 10/1/2009 | 1/1/2010 |
|---|---|---|---|---|---|---|---|---|---|
| Number of Reference Employee Stock Options that Lapsed Unvested During the Quarter Ending | -- | 10 | 9 | 8 | 0 | 0 | 0 | 0 | 0 |
| Number of Reference Employee Stock Options that Lapsed, Were Exercised or Were Forfeited During the Quarter Ending | -- | -- | -- | 20 | 20 | 20 | 10 | 1 | 2 |
| Size of the Reference Employee Stock Option Pool (in Number of Warrants) for Purposes of Determining the Reduced Notional Amount | 100 | 90 | 81 | 73 | 53 | 33 | 13 | 3 | 2 |
| Percentage of Remaining Notional Amount Subject to Automatic Early Partial Exercise | -- | -- | -- | 27.4% | 38% | 61% | 77% | 33% | 100% |
| Notional Amount as of Such Date | 1.0 | 1.0 | 1.0 | 0.726 | 0.452 | 0.178 | 0.041 | 0.0271 | 0 |
| Reduction in the Notional Amount for the Quarter Ending | -- | -- | -- | 0.274 | 0.274 | 0.274 | 0.137 | 0.0139 | 0.0271 |

FIG. 4

METHOD AND SYSTEM FOR CREATING AND MARKETING EMPLOYEE STOCK OPTION MIRROR IMAGE WARRANTS

CROSS-REFERENCE TO RELATED APPLICATIONS

This is a divisional application of U.S. patent application Ser. No. 11/179,861, titled "Method and System for Creating and Marketing Employee Stock Option Minor Image Warrants", filed on Jul. 12, 2005 (issued as U.S. Pat. No. 7,693,770 on Apr. 6, 2010), which in turn claims priority to U.S. Provisional Patent Application Ser. Nos. 60/599,629, filed Aug. 6, 2004 and 60/642,041, filed Jan. 7, 2005, both titled "Method and System for Creating and Marketing Employee Stock Option Mirror Images", the disclosures of which are incorporated herein by reference.

BACKGROUND

Companies issue employee stock options as a form of compensation. Recently the Financial Accounting Standards Board ("FASB") has issued a Statement of Financial Accounting Standards No. 123 (revised 2004) ("FAS123R"), which requires companies to expense those employee stock options. Under FAS123R, expensing requires an observable market price of an identical or similar equity instrument or if not available, an estimate of value using a model-based technique. Because the model-based techniques have certain limitations, what is needed for expensing employee stock options is an identical or similar equity instrument that has an observable market price.

The preceding description is not to be construed as an admission that any of the description is prior art relative to the present invention.

SUMMARY OF THE INVENTION

In one aspect, the invention provides a system and method for determining value of employee stock options. The system and method comprise issuing a plurality of options to company employees on company stock. The options include an exercise term, a strike price and a restriction on transfer or hedge. The system and method further comprise issuing a plurality of warrants on the company stock. The warrants include an amortization factor, the same or a substantially similar exercise term as the option, the same or a substantially similar strike price as the option, and provisions to periodically determine the amortization factor based on early forfeiture or early exercise of the options, apply the amortization factor to the warrants and determine an intrinsic value of the warrants. The system and method further comprise determining the market value of the warrants at issue, and determining the value of the options using the market value of the warrants at issue.

In one aspect, issuing the plurality of warrants is by SEC registered offering. In one aspect, issuing the plurality of warrants is by 144A offering. In one aspect, issuing the plurality of warrants is by private placement offering. In one aspect, the plurality of options include forfeiture and lapse terms and the plurality of warrants do not include any lapse terms. In one aspect, the plurality of warrants do not include a restriction on transfer or hedging. In one aspect, the plurality of warrants include limited restriction on transfer. In one aspect, the plurality of warrants include a full restriction on transfer and hedging. In one aspect, the provision to periodically determine the amortization factor is based on early forfeiture and early exercise of the options. In one aspect, the provision to periodically determine the amortization factor is based on vested options. In one aspect, the provision to periodically determine the amortization factor is based on a reference pool of options. In one aspect, the system and method further comprise hedging the warrants. In one aspect, the system and method further comprising hedging the warrants after a certain period or not at all. In one aspect, the number of warrants issued is a percentage of the number of options issued. In one aspect, the number of warrants issued is about 5 to 15 percent of the number of options issued. In one aspect, the provision to determine the amortization factor occurs about every quarter. In one aspect, the provision to apply the amortization factor occurs a predetermined number of days after determining the amortization factor. In one aspect, the provision to apply the amortization factor occurs about 30 days after determining the amortization factor. In one aspect, the plurality of warrants further comprise a provision to settle a value due to holders of the warrants after determining the amortization factor. In one aspect, the plurality of warrants further comprise a provision to change terms of the plurality of warrants in response to a change in terms of the options. In one aspect, the plurality of warrants further comprise a provision to deliver a product of the intrinsic value and a fraction subject to prepayment. In one aspect, the provision to determine an intrinsic value of the warrants is after applying the amortization factor.

In one aspect, the invention provides a warrant on company stock that is used to determine accounting value of employee options on company stock. The warrant comprises an amortization factor, an exercise term that is the same or substantially similar to an exercise term of the employee options, and a strike price that is the same or substantially similar to a strike price of the employee options. The warrant also comprises a provision to periodically determine the amortization factor based on early forfeiture or early exercise of the employee options, a provision to apply the amortization factor to the warrant, and a provision to determine an intrinsic value of the warrant. In one aspect, value of the employee options for US GAAP reporting purposes is determined using market value of the warrant at issue.

In one aspect, the warrant does not include a restriction on transfer. In one aspect, the warrant includes a limited restriction on transfer. In one aspect, the warrant includes a full restriction on transfer and hedging. In one aspect, the provision to periodically determine the amortization factor is based on early forfeiture and early exercise of the employee options. In one aspect, the provision to periodically determine the amortization factor is based on vested employee options. In one aspect, the provision to periodically determine the amortization factor is based on a reference pool of employee options. In one aspect, the provision to determine the amortization factor occurs about every quarter. In one aspect, the provision to apply the amortization factor occurs a predetermined number of days after determining the amortization factor. In one aspect, the provision to apply the amortization factor occurs about 30 days after determining the amortization factor. In one aspect, the warrant further comprises a provision to settle a value due to a holder of the warrant after determining the amortization factor. In one aspect, the warrant further comprises a provision to change terms of the warrant in response to a change in terms of the employee options. In one aspect, the warrant further comprises a provision to deliver a product of the intrinsic value and a fraction subject to prepayment. In one aspect, the provision to determine an intrinsic value of the warrant is after applying the amortization factor.

In one aspect, the intrinsic value delivered to a warrant holder is determined as the weighted average intrinsic value delivered per vested reference option that is subject to prepayment during such period. In one aspect, the intrinsic value delivered to a warrant holder is determined as the intrinsic value at such time of automatic early exercise (e.g., T+30).

The foregoing specific aspects are illustrative of those which can be achieved and are not intended to be exhaustive or limiting of the possible advantages that can be realized. Thus, the advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

In the embodiments described herein, a company issues a warrant that mirrors employee stock options, and the market price of the warrant at issue is used to value the employee stock options. This allows the company to expense the employee stock options using the market value of the warrant.

Employee Stock Options

Companies grant employee stock options (ESOs) to employees and management. These ESOs are typically fixed strike call options that are issued by the employer or company, and are subject to vesting and other restrictions. One significant restriction is that ESOs may not be resold, pledged or hedged. Another significant restriction is that ESOs may not be exercised until vested, and that the holder must forfeit the ESO upon termination of employment Typically the issuing company board of directors controls transferability of ESOs. Limited transferability may be allowed for employees for estate purposes (gifting or transfer of ESO to a family trust or family member). However the ESOs are still subject to vesting restrictions, and lapse rules (or if lapse rules have been removed, then claw-back provisions against the employee if they leave within a specified time period). In a small number of circumstances, some companies may allow senior executives to transfer ESOs to an "exchange fund" partnership to diversify their ESO positions.

FASB and FAS123R

In December 2004, the Financial Accounting Standards Board ("FASB") issued a Statement of Financial Accounting Standards No. 123 (revised 2004) ("FAS123R"), which requires companies to expense ESOs. Under FAS123R, expensing requires an observable market price of an identical or similar equity instrument or if not available, an estimate of value using a model-based technique.

There is no commonly accepted model-based technique to value ESOs other than using option pricing methodology. Transferable stock options can be priced using an option pricing model and risk-neutral pricing theory. However, because ESOs are not hedgeable and are not transferable, there is some debate on the applicability of model based expense estimates. The lack of transferability and required forfeiture/lapse upon termination of employment also motivate employees to exercise their ESOs early, which is suboptimal from a theoretical risk neutral valuation perspective. The models used to value ESOs tend to be "modified Black-Scholes" or binomial models for American style options. For ESOs, because they are subject to restrictions such as lapse and lack of tradability, these option pricing models and the techniques used to value ESOs are modified in an attempt to take into account: a) the options granted that never vest are not expensed or valued from an accounting sense (i.e., they are essentially ignored for valuation purposes); and b) the fact that holders of ESOs exercise early and thus ESOs have shorter expected lives than their final maturity. It is generally understood that the lack of transferability and risk of lapse leads to early exercise by employees. Early exercise effectively makes the ESO a shorter dated option. Currently, employers use historical employee retention and early exercise behavior to model the expected lives for ESOs.

Instead of a model-based technique to value and expense ESOs, the embodiments described herein provide an observable market price of a similar equity instrument.

An Example System

Figure 1:
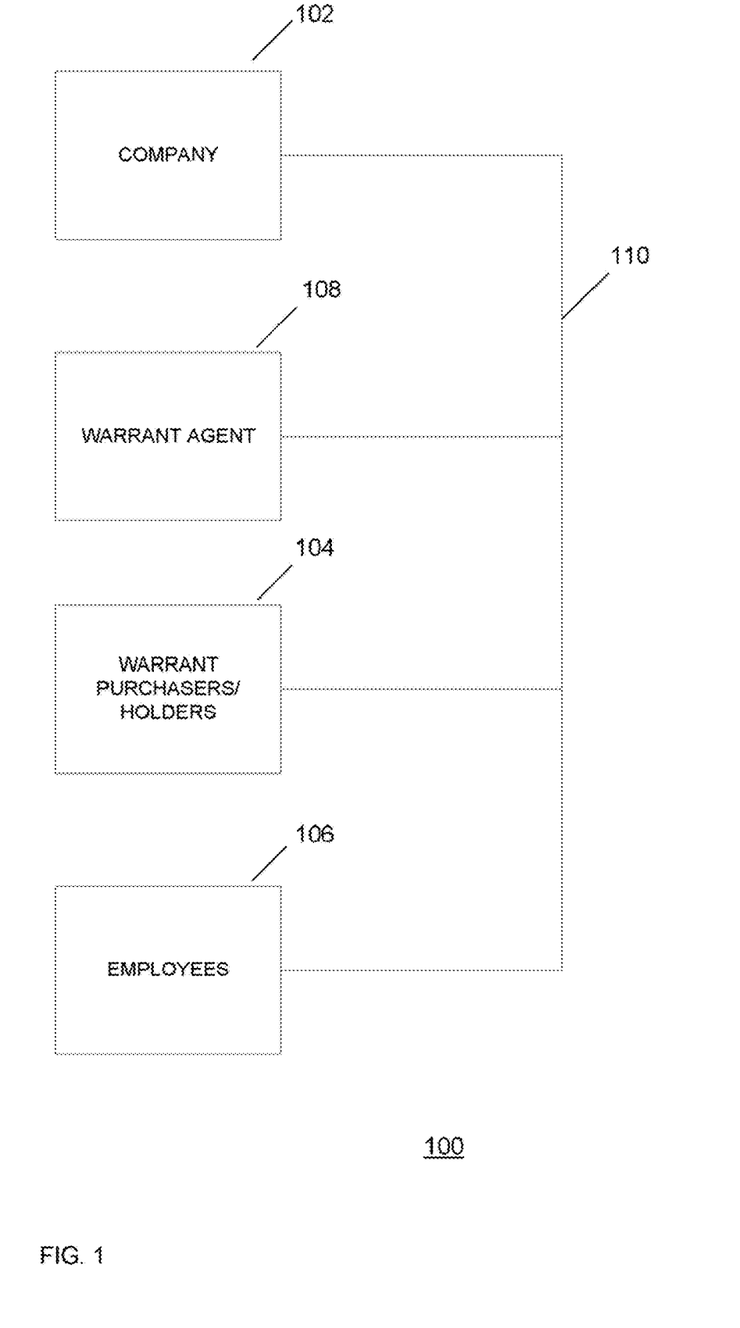
FIG. 1 illustrates an example system according to one embodiment.

Referring to FIG. 1, system 100 according to one embodiment includes a company 102, warrant purchasers/holders 104, employees holding ESOs 106 and a warrant agent 108. A network 110 generally connects company 102, warrant purchasers/holders 104, employees holding ESOs 106 and warrant agent 108. Although not illustrated, some or all of company 102, warrant purchasers/holders 104, employees holding ESOs 106 and warrant agent 108 include computers with a central processor (CPU) to execute software code, memory (RAM, ROM, etc.), input/output devices (keyboards, displays, printers, pointing devices, etc.), fixed and removable storage media (hard drive, floppy drive, optical drive, CD, DVD, etc.) to store software code, and interface devices (modem, Ethernet card, WiFi card, blue tooth, etc.). Network 110 may be a LAN, WAN, intranet, extranet, the Internet, the PSTN or other similar form of connection that can transmit information signals.

An Example Method

The embodiments that are described provide an observable market price of a similar equity instrument for the ESOs. Under these embodiments, forfeitures of ESOs prior to vesting are ignored for expensing and have no effect on the warrant. The warrants are subject to partial early amortization as a function of early exercise and forfeiture of the underlying vested pool of ESOs as defined by the amortization algorithm. This amortization process forces the warrant buyer to consider the early risk of forfeiture and exercise in pricing the warrants at issue.

On a periodic basis after issue (usually quarterly), the company (or its agent) calculates the percentage early amortization that has occurred in the vested pool of ESOs and reports that activity. The report triggers early partial amortization of the warrants some number of days later.

Figure 2:
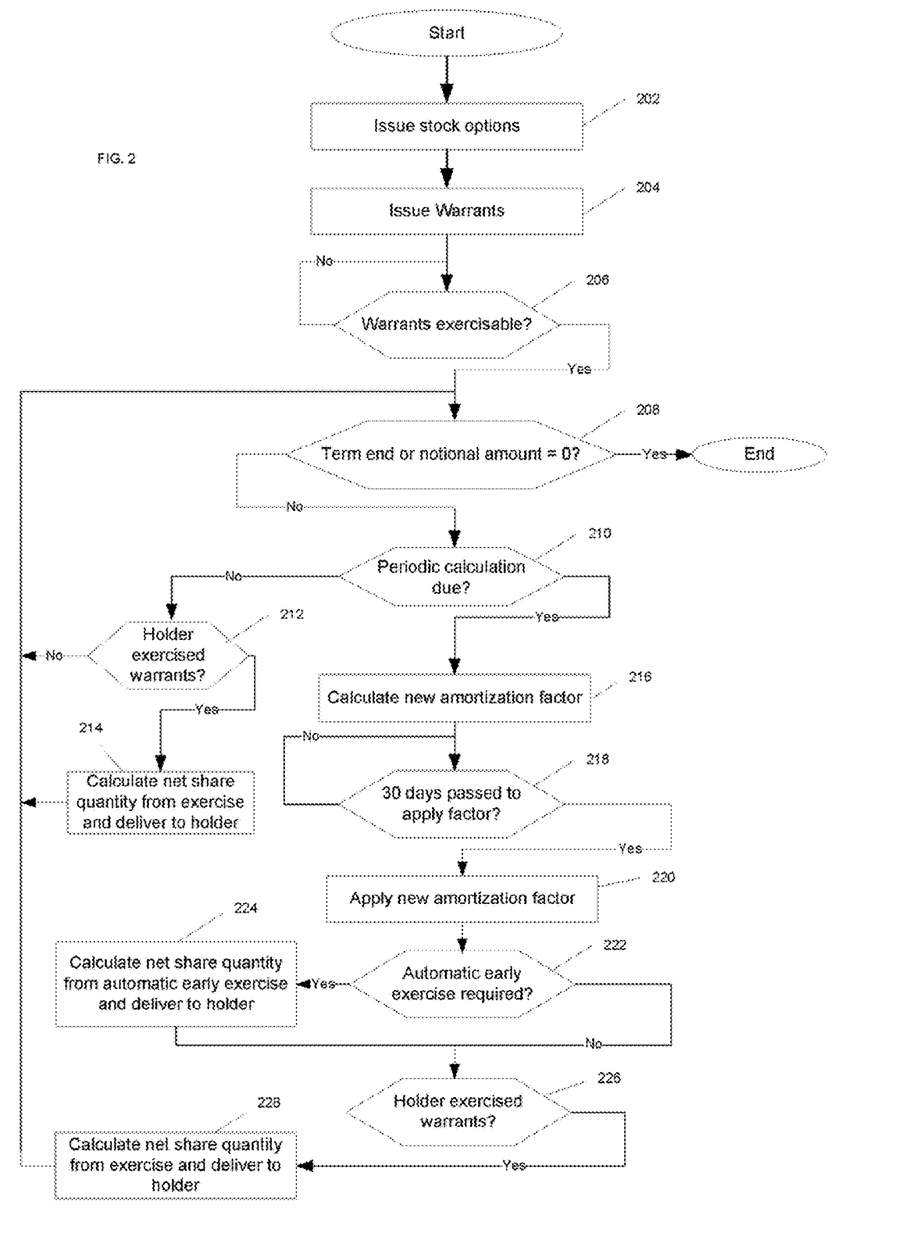
FIG. 2 illustrates steps in an example method according to one embodiment.

Referring to FIG. 2, at step 202, company 102 issues ESOs to employees 106. As discussed elsewhere, the ESOs have a number of associated terms.

At step 204, company 102 issues warrants that are purchased by warrant purchasers 104. Also as discussed elsewhere, the warrants have a number of associated terms.

At step 206, system 100 determines whether the warrants are exercisable, and if not, system 100 loops to step 206.

If at step 206, system 100 determines that the warrants are exercisable, then at step 208, system 100 determines whether the warrant expiration date has been reached, or whether the notional amount is zero, and if so ends.

If at step 208, system 100 determines that the warrant expiration date has not been reached and that the notional amount is not zero, then at step 210, system 100 determines whether a periodic (e.g., quarterly) calculation is due.

If at step 210, system 100 determines that no periodic calculation is due, then at step 212, system 100 determines whether a warrant purchaser/holder 104 has exercised any warrants, and if so, at step 214 system 100 calculates the net share quantity due and delivers the shares and any cash for fractional shares to warrant agent 108. System 100 then loops to step 208.

If at step 210, system 100 determines that a periodic calculation is due, then at step 216, system 100 calculates the new amortization factor. This starts a time clock (e.g., 30 days) at step 218.

After the time clock expires, then system 100 applies the amortization factor at step 220.

At step 222, system 100 determines whether a partial early exercise is required, and if so, at step 224 system 100 calculates the net share quantity due from automatic early execution and delivers the shares and any cash for fractional shares to warrant agent 108.

At step 226, system 100 determines whether a warrant purchaser/holder 104 has exercised any warrants, and if not, system 100 loops to step 208. If so, then at step 228 system 100 calculates the net share quantity due and delivers the shares and any cash for fractional shares to warrant agent 108. System 100 then loops to step 208.

Example Illustrations of the System and Method

The warrants to purchase shares of the company common stock have an earliest exercise date and an expiration date, which correspond to the vesting and expiration dates of the underlying ESOs. Each warrant entitles the warrant holder to purchase a notional number of shares of the company common stock based on a stated exercise price that is subject to adjustment upon the occurrence of certain events. The warrants will deliver this value as net shares. Initially, the notional number of shares underlying each warrant, which is referred to as the notional amount, is equal to one, and is subject to reduction as the number of vested reference ESOs decreases due to lapse, forfeiture or exercise. Upon exercise of a warrant, whether by the holder or by an automatic partial early exercise, the warrant holder receives the intrinsic value of the warrant (described more fully below), if positive, multiplied by the notional amount of such warrant that is subject to such early exercise, payable in shares of the company common stock and cash in lieu of a fractional share. Holders may exercise their warrants on or after the vesting date (which is subject to acceleration), and on or prior to the expiration date.

Notional Amount

The notional amount is subject to reduction as the number of vested reference ESOs decreases due to lapse, forfeiture or exercise. At the beginning of the first calendar quarter immediately following the vesting date and continuing thereafter on a periodic (e.g., quarterly) basis until the earlier of the expiration date and the date on which the notional amount is equal to zero, the notional amount of all warrants is reduced by the percentage reduction in the size of the reference ESO pool since the immediately preceding reduction (or the vesting date in the case of the first reduction).

Initially, the reference ESOs include all ESOs (both vested and unvested) that are granted to the company employees on a particular date, with a particular exercise price, and with a particular expiration date.

Figure 3:
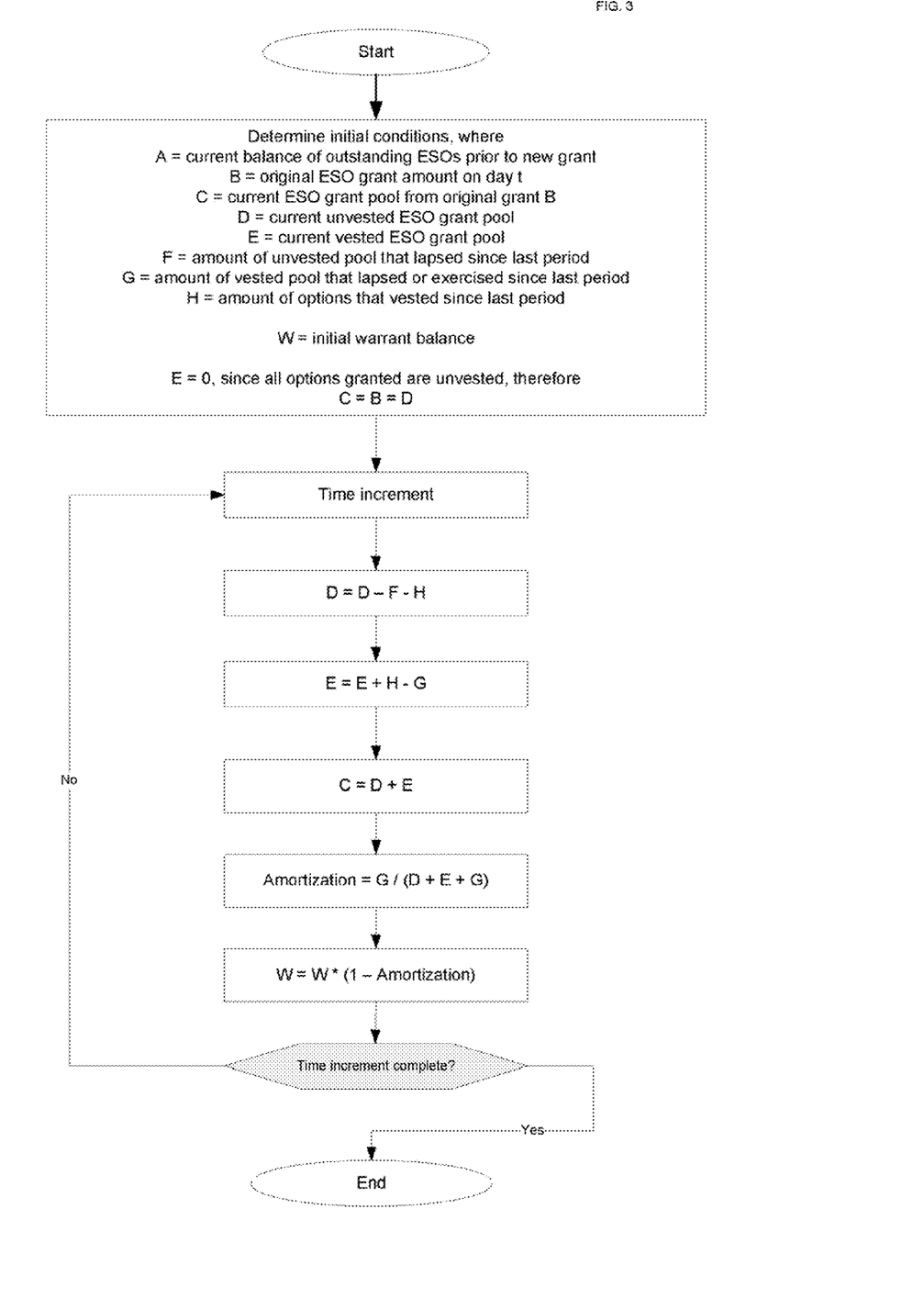
FIG. 3 illustrates steps in an example method according to one embodiment.

Referring to FIG. 3, the size of the reference ESO pool at the end of any quarterly period is equal to the sum of the number of unvested reference ESOs (D), plus the number of vested reference ESOs (E), plus the number of vested reference ESOs that lapsed, were exercised or the were forfeited since the beginning of the immediately preceding quarter (or the vesting date in the case of the first quarter) (G).

For example, if the first date on which reference ESOs vested is Jan. 1, 2008, assuming the reference ESO pool (D+E+G) contained 500,000 reference ESOs as of Apr. 1, 2008, and during the period beginning on Jan. 1, 2008 and ending on Apr. 1, 2008, 100,000 vested reference ESOs lapsed, were forfeited or were exercised (G) and zero unvested options lapsed or were forfeit, leaving 400,000 unvested plus vested ESOs remaining (D+E), then the notional amount of all warrants would be reduced 20% (100,000, divided by 500,000) from 1.0 to 0.8 for this period.

If during the subsequent quarter beginning Apr. 1, 2008 and ending Jun. 30, 2008, an additional 100,000 vested reference ESOs lapsed, were forfeited or were exercised (G), and if the reference ESO pool (D+E+G) contained 250,000 reference ESOs as of Jul. 1, 2008 because 150,000 unvested ESOs lapsed (F), then the notional amount of all warrants would be reduced 40% from 0.8 to 0.48 and (0.8−0.48 or 0.32 would be the partial warrant that is prepaid).

Figure 4:
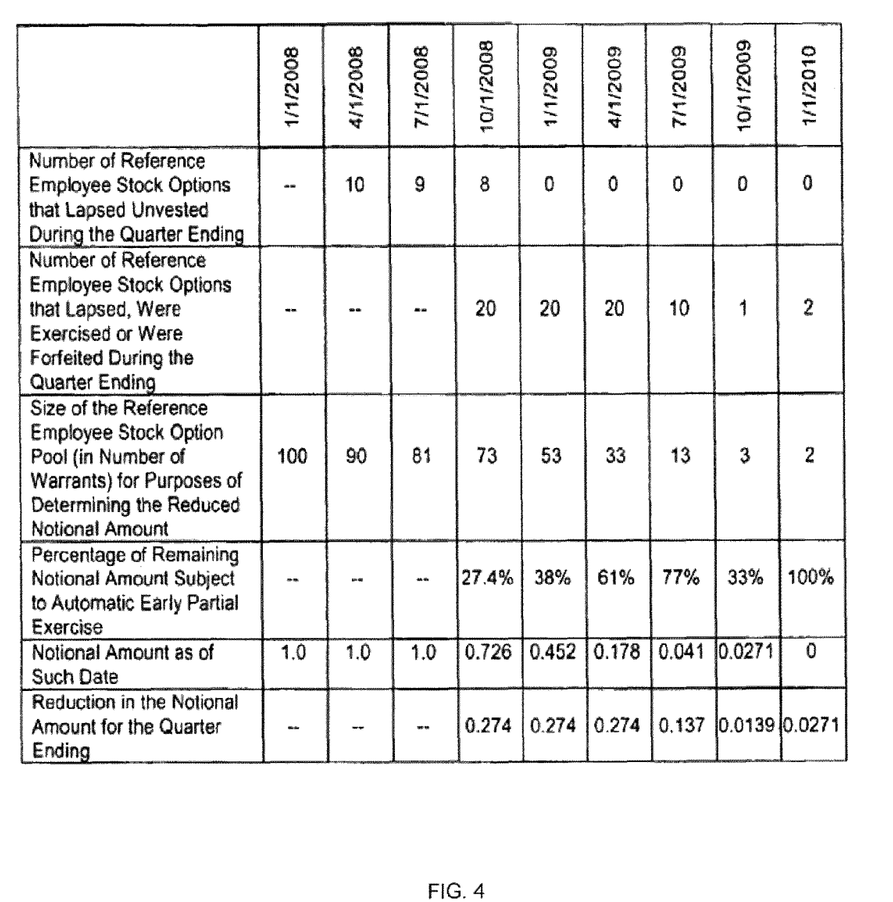
FIG. 4 illustrates an example according to one embodiment.

As another example, in the situation set forth on FIG. 4, the notional amount would be reduced on Oct. 1, 2008 from 1.0 to 0.726. Similarly, the notional amount would be reduced on Jan. 1, 2009 from 0.726 to 0.452. Then, the notional amount would be reduced on Apr. 1, 2009 from 0.452 to 0.178. On Jul. 1, 2009, the notional amount would reduced from 0.178 to 0.041. On Oct. 1, 2009, the notional amount would reduced from 0.041 to 0.0271. Finally, on Jan. 1, 2010, the notional amount would reduced from 0.0271 to 0.

On a periodic (e.g., quarterly) basis, after calculating the amortization factor described above, the company announces the percentage amount by which the vested reference ESO pool has decreased since the immediately preceding reduction (or the vesting date in the case of the first reduction), the number of vested reference ESOs that lapsed, were forfeited or were exercised since the beginning of the immediately preceding quarter (or the vesting date in the case of the first reduction) and the resulting percentage reduction in the notional amount. The reduction in the notional amount results in an automatic partial early exercise of all warrants for only the portion represented by the reduction in the notional amount. Generally, this automatic partial early exercise occurs on the first business day that is at least 30 days after the announcement of the percentage amount by which the notional amount is being reduced, and the exercise occurs in the same manner as any voluntary exercise by a holder and the intrinsic value delivered to the warrant holder is determined as follows:

Intrinsic Value and Payment in Stock and Cash

The intrinsic value of the warrants is determined by the following formula:

$$\text{Intrinsic Value} = CR \times \text{MAX}(0, CP - EP),$$

where, CR is the conversion rate for the warrants, which is initially equal to one and is subject to adjustment; CP is the closing price of the company common stock on the trading day after the warrants are exercised; EP is the exercise price of the warrants, and is equal to MP/CR; and MP is the market price of the company common stock on the day that the warrants are issued.

Payment to warrant holders is made in shares of the company common stock and cash in lieu of a fractional share.

For example, assuming that the conversion rate of the warrants (CR) is one, and the notional amount of the warrants is also one, if the market price of the company common stock on the day that the warrants are issued (MP) is $25.00, and the closing price of the company common stock on the trading day after the warrants are exercised (CP) is $50.00, then a holder exercising one warrant would receive (assuming a constant stock price of $50.00 following the exercise date) an amount of cash (in lieu of a fractional share of common stock) equal to:

Notional Amount×Intrinsic Value, or
1×[CR×[CP−EP]], or
1×[1×[50−(25/1)]], or
1×1×25, or
$25.00 (since this is worth less than a full share).

Under the same circumstances, a holder exercising 100 warrants would receive 50 shares of the company common stock (which represents $25.00×100 warrants, or $2,500 of value, assuming a stock price of $50.00 when the shares are delivered to the exercising holder.)

As another example, assuming that the conversion rate of the warrants (CR) is one, but the notional amount of the warrants has been reduced to 0.5 as described herein. If the market price of the company common stock on the day that the warrants are issued (MP) is $25.00, and the closing price of the company common stock on the trading day after the warrants are exercised (CP) is $50.00, then a holder exercising one warrant would receive (assuming a constant stock price of $50.00 following the exercise date) an amount of cash (in lieu of a fractional share of common stock) equal to:

Notional Amount×Intrinsic Value, or
0.5×CR×(CP−EP), or
0.5×1×[50−(25/1)], or
0.5×1×25, or
$12.50.

Under the same circumstances, a holder exercising 100 warrants would receive 25 shares of the company common stock (which represents $12.50×100 warrants, or $1,250 of value, assuming a stock price of $50.00 when the shares are delivered to the exercising holder).

As another example, assuming that the conversion rate of the warrants (CR) is two due to an adjustment to the conversion rate as discussed below, and the notional amount of the warrants has been reduced to 0.15 due to an automatic partial early exercise of the warrants. If the market price of the company common stock on the day that the warrants are issued (MP) is $25.00, and the closing price of the company common stock on the trading day after the warrants are exercised (CP) is $50.00, then a holder exercising one warrant would receive (assuming a constant stock price of $50.00 following the exercise date) an amount of cash (in lieu of a fractional share of common stock) equal to:

Notional Amount×Intrinsic Value, or
0.15×CR×(CP−EP), or
0.15×2×[50−(25/2)], or
0.15×2×37.5, or
11.25.

Under the same circumstances, a holder exercising 100 warrants would receive 22 shares of the company common stock plus $25.00 in cash, (which represents $11.25×100 warrants, or $1125 of value, assuming a stock price of $50.00 when the shares are delivered to the exercising holder).

As another example, assuming that the conversion rate of the warrants (CR) is two due to an adjustment of the conversion rate, and the notional amount of the warrants has been reduced to 0.15 due to an automatic partial early exercise of the warrants, if the market price of the company common stock on the day that the warrants are issued (MP) is $25.00, and the closing price of the company common stock on the trading day after the warrants are exercised (CP) is $5.00, then a holder exercising one warrant would receive nothing because the intrinsic value of the warrants (as calculated below) is negative:

Notional Amount×Intrinsic Value, or
0.15×CR×(CP−EP), or
0.15×2×[5−(25/2)], or
0.15×2×−7.5, or
0.15×−$15.00.

As a further example (using facts from examples above), if the first date on which reference ESOs vested is Jan. 1, 2008, assuming the reference ESO pool contained 500,000 reference ESOs as of Apr. 1, 2008, and during the period beginning on Jan. 1, 2008 and ending on Apr. 1, 2008, 100,000 vested reference ESOs lapsed, were forfeited or were exercised, then the notional amount of all warrants would be reduced 20% (100,000, divided by 500,000) from 1.0 to 0.8. As a result, on the first business day that is at least 30 days after the announcement of this reduction in the notional amount, an automatic partial early exercise would occur. Assuming that the conversion rate of the warrants (CR) is one, if the market price of the company common stock on the day that the warrants are issued (MP) is $25.00, and the closing price of the company common stock on the first business day that is at least 30 days after the announcement of this reduction in the notional amount (CP) is $50.00, then a holder of warrants would receive in connection with the resulting automatic partial early exercise, assuming a constant stock price of $50.00 following exercise date, $5.00 per warrant in value (or the 20% reduction in the notional amount, multiplied by the $25.00 intrinsic value of the warrant).

As another example (using facts from examples above), during the subsequent quarter from Apr. 1, 2008 to Jun. 30, 2008, an additional 100,000 vested reference ESOs lapsed, were forfeited or were exercised (G), and if the reference ESO pool contained 250,000 reference ESOs (D+E+G) as of Jul. 1, 2008 because 150,000 unvested shares lapsed during such period (F) and are not part of the ending pool, then the notional amount of all warrants would be reduced 40% (G/(D+E+G) or 100,000/250,000 reductions) from 0.8 to 0.48. As a result, on the first business day that is at least 30 days after the announcement of this reduction in the notional amount, an automatic partial early exercise would occur. Assuming that the conversion rate of the warrants (CR) is one, if the market price of the company common stock on the day that the warrants are issued (MP) is $25.00, and the closing price of the company common stock on the first business day that is at least 30 days after the announcement of this reduction in the notional amount (CP) is $50.00, then a holder of warrants would receive in connection with the resulting automatic partial early exercise, assuming a constant stock price of $50.00 following the exercise date, $8.00 per warrant in value (or the 40% reduction in the notional amount, multiplied by 0.8 (the notional amount prior to reduction), multiplied by the $25.00 intrinsic value of the warrant).

Referring again to FIG. 4, for another example, when the notional amount is reduced on Oct. 1, 2008 from 1.0 to 0.726, then 27.4% of the notional amount of each warrant is subject to automatic early partial exercise. Similarly, when the notional amount is reduced on Jan. 1, 2009 from 0.726 to 0.452, then 38% of the remaining notional amount of each warrant is subject to automatic early partial exercise. When the notional amount is reduced on Apr. 1, 2009 from 0.452 to 0.178, then 61% of the remaining notional amount of each warrant is subject to automatic early partial exercise. On Jul. 1, 2009, when the notional amount is reduced from 0.178 to 0.041, then 77% of the remaining notional amount of each warrant is subject to automatic early partial exercise. On Oct. 1, 2009, when the notional amount is reduced from 0.041 to 0.0271, then 33% of the remaining notional amount of each warrant is subject to automatic early partial exercise. Finally, on Jan. 1, 2010, when the notional amount is reduced from 0.0271 to 0, then 100% of the remaining notional amount of each warrant is subject to automatic early partial exercise.

As illustrated in the example of FIG. 4, when on Jul. 1, 2009, the notional amount is reduced from 0.178 to 0.041, 30 days after the announcement of this reduction in the notional amount, an automatic partial early exercise occurs. Assuming that the conversion rate of the warrants (CR) is one, if the market price of the company common stock on the day that the warrants are issued (MP) is $25.00, and the closing price of the company common stock on the first business day that is at least 30 days after the announcement of this reduction in the notional amount (CP) is $50.00, resulting in an intrinsic value of $25.00, then a holder of one warrant would receive in connection with the resulting automatic partial early exercise, assuming a constant stock price of $50.00 following the exercise date, $3.4265 in cash (or the 77% reduction in the notional amount, multiplied by 0.178 (the notional amount prior to reduction), multiplied by the $25.00 intrinsic value of the warrant).

On any day that warrants are exercised (either at the election of the holder or in connection with an automatic partial early exercise), all warrants exercised on that day are aggregated for purposes of determining the total number of shares of the company common stock (and cash in lieu of a fractional share) that the company delivers.

For example, if 20 holders each holding 50 warrants exercise their warrants on the same day, the total number of shares of the company common stock that the company delivers to the warrant agent is calculated as if one holder of 1,000 warrants (20 holders×50 warrants=1,000 warrants) had exercised its warrants.

Similarly, if 15 holders each holding two warrants, and one holder holding 70 warrants, exercise their warrants on the same day, the total number of shares of the company common stock that the company delivers to the warrant agent is calculated as if one holder of 100 warrants [(15 holders×2 warrants)+(1 holder×70 warrants)] had exercised its warrants.

In the event that the reference ESO pool as of the vesting date does not contain any ESOs, the notional amount is not reduced.

If, at the close of regular trading on the expiration date, the notional amount is greater than zero, all outstanding warrants are automatically exercised, and the holders of the warrants receive the intrinsic value of their warrants, if positive, multiplied by the notional amount of the warrant payable in shares of the company common stock and cash in lieu of a fractional share.

If the vesting date of any reference ESO is accelerated for any reason, the vesting date for all of the warrants will accelerate to the earliest date to which any option in the reference ESO pool is accelerated.

Conversion Rate

Initially, the conversion rate is one (1). The company will adjust the conversion rate of the warrants if any of the following events occur:

(a) If the company issues shares of the company common stock as a dividend or distribution on shares of the company common stock, or if the company effects a stock split or share combination, then the conversion rate is adjusted based on the following formula:

$$CR' = CR_0 * \frac{OS'}{OS_o}$$

where, CR' is the conversion rate in effect immediately after the event; $CR_0$ is the conversion rate in effect immediately prior to the event; $OS_0$ is the number of the company shares of common stock outstanding immediately prior to the event; and OS' is the number of the company shares of common stock outstanding immediately after the event;

(b) If the company issues to all or substantially all holders of the company common stock any rights or warrants entitling them for a period of not more than 45 days to subscribe for or purchase shares of the company common stock at a price per share less than the closing price of the company common stock on the business day immediately preceding the time of announcement of the issuance, the conversion rate is adjusted based on the following formula (provided that the conversion rate will be readjusted to the extent that such rights or warrants are not exercised prior to their expiration):

$$CR' = CR_0 * \frac{OS_0 + X}{OS_0 + Y}$$

where, CR' is the conversion rate in effect immediately after the event; $CR_0$ is the conversion rate in effect immediately prior to the event; $OS_0$ is the number of shares of the company common stock outstanding immediately prior to the event; X is the total number of shares of the company common stock issuable pursuant to the right; and Y is the number of shares of the company common stock equal to the aggregate price payable to exercise such rights, divided by the average of the closing prices of the company common stock for the ten consecutive trading days prior to the business day immediately preceding the ex-dividend date with respect to the issuance of the rights;

(c) If the company distributes shares of the company capital stock, evidences of the company indebtedness or other assets or property of the company to all or substantially all holders of the company common stock, excluding: dividends, distributions and rights or warrants referred to in (a) or (b) above; and dividends or distributions paid exclusively in cash referred to in (d) below, the conversion rate is adjusted based on the following formula:

$$CR' = CR_0 * \frac{SP_0}{SP_0 - FMV}$$

where, CR' is the conversion rate in effect immediately after the distribution, $CR_0$ is the conversion rate in effect immediately prior to the distribution; $SP_0$ is the average of the closing prices of the company common stock for the ten days prior to the business day immediately preceding the ex-dividend date with respect to the distribution; and FMV is the fair market value (as determined by the company board of directors) of the shares of capital stock, evidences of indebtedness, assets or property distributed with respect to each outstanding share of the company common stock on the record date for the distribution;

(d) If the company makes a payment of dividends or other distributions consisting solely of cash to all holders of the company common stock (excluding any cash that is part of a distribution referred to in (c) or any regular quarterly cash dividend or distribution) to the extent that those distributions, combined together with the aggregate amount of all other such all-cash distributions (other than regular quarterly cash dividends or distributions) to all holders of the company common stock made within the 12 months preceding the date of payment of the distributions, and in respect of which no adjustment pursuant to this paragraph (d) has been made exceeds 10% of the company market capitalization on the record date for that distribution, the conversion rate is adjusted based on the following formula:

$$CR' = CR_0 * \frac{CM}{CM_0}$$

where, CR' is the conversion rate in effect immediately after the distribution; $CR_0$ is the conversion rate in effect immediately prior to the distribution; $CM_0$ is the current market price of the company common stock on the record date for the distribution less the amount of cash so distributed applicable to one share of the company common stock; and CM is the current market price of the company common stock; or (e) If the company or any of the company subsidiaries makes a payment in respect of a tender offer or exchange offer for the company common stock, to the extent that the cash and value of any other consideration included in the payment per share of common stock exceeds the closing price of the company common stock on the trading day immediately preceding the day on which the tender offer or exchange offer is announced, the conversion rate is adjusted based on the following formula:

$$CR' = CR_0 * \frac{AC + (SP' * OS')}{OS_0 * SP'}$$

where, CR' is the conversion rate in effect on the day next succeeding the date the tender or exchange offer expires; $CR_0$ is the conversion rate in effect on the date the tender or exchange offer expires; AC is the aggregate value of all cash and any other consideration paid or payable for shares purchased in the tender or exchange offer; $OS_0$ is the number of shares of common stock outstanding immediately prior to the date the tender or exchange offer expires; OS' is the number of shares of common stock outstanding immediately after the date the tender or exchange offer expires; and SP' is the average of the closing prices of the company common stock for the ten consecutive trading days commencing on the trading day immediately after the date the tender or exchange offer expires.

In the event of any reclassification of the company common stock in which holders of the company outstanding common stock would be entitled to receive cash, securities or other property for their shares of common stock, holders of warrants are generally entitled to exercise their warrants for the same type of consideration received by holders of the company common stock immediately prior to the reclassification.

Exercise of Warrants and Settlement

Holders may exercise their warrants on or after the vesting date, and on or prior to the expiration date. If voluntarily exercising, holders must exercise all their holdings.

Upon exercise of any warrant, the company will pay its holder the product of the intrinsic value of the warrants, if positive, and the remaining notional amount of the warrant. Initially, the notional amount is equal to one, and as discussed above, the notional amount is subject to reduction as the number of vested reference ESOs decreases due to lapse, forfeiture or exercise.

On any day that warrants are exercised (either at the election of the holder or in connection with an automatic partial early exercise), all warrants exercised on the day are aggregated for purposes of determining the total number of shares of the company common stock (and cash in lieu of a fractional share) that the company delivers.

For example, if 20 holders each holding 50 warrants exercise their warrants on the same day, the total number of shares of the company common stock that the company delivers to the warrant agent is calculated as if one holder of 1,000 warrants (20 holders×50 warrants=1,000 warrants) had exercised its warrants.

Similarly, if 15 holders each holding two warrants, and one holder holding 70 warrants, exercise their warrants on the same day, the total number of shares of the company common stock that the company delivers to the warrant agent is calculated as if one holder of 100 warrants [(15 holders×2 warrants)+(1 holder×70 warrants)] had exercised its warrants.

As a further example, if one holder of nine warrants, three holders each holding one warrant, four holders each holding ten warrants and eleven holders of 150 warrants exercise their warrants on the same day, the total number of shares of the company common stock that the company delivers to the warrant agent is calculated as if one holder of 1702 warrants [9+(3×1)+(4×10)+(11×150)] had exercised its warrants.

Promptly following any date on which warrants are exercised the company will deliver to the warrant agent the aggregate number of shares of the company common stock, plus cash in lieu of a fractional share. As promptly as practicable, each exercising holder will receive a whole number of shares due in connection with exercise of its warrants, plus cash in lieu of a fractional share. Holders that are owed fewer than one share of the company common stock upon exercise will receive solely cash in lieu of a fractional share.

In addition to cash paid by the company to the warrant agent (in lieu of a fractional share), cash payable to holders in lieu of fractional shares is generated from the sale by the warrant agent of shares not delivered to holders as a whole number of shares. The cash is distributed to holders as promptly as practicable, and the distribution is made on a proportional basis based on the number of warrants being exercised by each exercising holder.

For example, if 15 holders each holding two warrants, and one holder holding 70 warrants, exercised their warrants on the same day, and the product of the notional amount and the intrinsic value is $25.00, then the holder with 70 warrants would receive 35 shares of the company common stock (which represents $25.00×70 warrants, or $1,750 of value, assuming a stock price of $50.00 when the shares are delivered to the exercising holder), and each holder of two warrants would receive one share of common stock (which represents $25.00×2 or $50 of value, assuming a stock price of $50.00 when the shares are delivered to the exercising holder).

If, however, under similar circumstances, the closing price of the company common stock on the trading day after the warrants are exercised is $40.00 and the product of the notional amount and the intrinsic value is $15.00, then the holder with 70 warrants would receive 21 shares of the company common stock (which represents $15.00×70 warrants or $1,050 of value, assuming a stock price of $50.00 when the shares are delivered to the exercising holder), and each holder of two warrants would receive (assuming a stock price of $50.00 following the exercise date) $15.00 cash. Each holder of two warrants would not receive any shares of common stock, because it would be entitled to less than one share of common stock upon conversion.

In the previous example, if the warrant agent sells shares into the market at a price higher than $50.00 per share, each holder of two warrants will receive more than $15.00 in cash. The amount of cash would increase by the percentage increase in the price of the company common stock over $50.00 per share. Conversely, if the warrant agent sells shares into the market at a price lower than $50.00 per share, each holder of two warrants will receive less than $15.00 in cash. The amount of cash would decrease by the percentage decrease in the price of the company common stock over $50.00 per share.

Regardless of the price at which the warrant agent sells shares into the market, for purpose of calculating the amount of cash to be delivered to exercising holders, the amount of cash initially delivered by the company to the warrant agent in lieu of a fractional share of common stock, plus the amount of cash generated by the warrant agent selling common stock received from the company into the market, is divided among exercising holders such that all holders that receive solely cash in connection with exercise of their warrants will receive the same amount of cash per warrant exercised, and all holders that receive any cash in connection with exercise of their warrants will receive the same amount of cash per fractional share of common stock to which they are entitled in connection with such exercise.

As an example, if the amount of cash initially delivered by the company to the warrant agent in lieu of a fractional share of common stock is $8.00, the amount of cash generated by the warrant agent selling common stock received from the company into the market is $160, and ten holders each holding one warrant exercised their warrants on the relevant exercise date and are entitled to such cash, then each holder will receive $16.80 of cash (assuming the holders are not entitled to a whole number of shares in connection with the exercise) in connection with the exercise for a total payout of $168 ($16.80×10=$168).

As a second example, if the amount of cash initially delivered by the company to the warrant agent in lieu of a fractional share of common stock is $8.00, the amount of cash generated by the warrant agent selling common stock received from the company into the market is $160, and ten holders, four each holding one warrant, and six each holding two warrants, exercised their warrants on the relevant exercise date and are entitled to the cash, each holder of one warrant will receive $10.50 of cash in connection with the exercise, and each holder of two warrants will receive $21.00 of cash (assuming none of the holders are entitled to a whole number of shares in connection with the exercise) in connection with the exercise, for a total payout of $168 [(4×$10.50)+(6×$21.00)=$168].

Automatic Early Vesting of the Warrants

If the vesting date of any reference ESO is accelerated for any reason, the earliest exercise date for all of the warrants is accelerated to the earliest date to which any option in the reference ESO pool is accelerated.

Determination of ESO Value Using Warrant Issue Price

Depending on the method of distribution of the warrant (SEC registered or 144A), the exercise price of the warrant may differ from the exercise price of the options. An appropriate adjustment would be made to the warrant price to get the estimated ESO cost taking into account the strike price differential.

A Further Variation

In the embodiments described above, there is generally some delay between the activities that occur in the ESO pool and the adjustments, such as automatic early exercise, that are applied to the warrants. Because of this delay, it is possible that the intrinsic value of the ESOs and the warrant differ.

In another embodiment, the effect of the time delay is reduced or eliminated, and warrant holders receive the same weighted average intrinsic value per option that employees receive for their lapsed, forfeit, or exercised vested option. This intrinsic value is then multiplied by the fractional amount of the warrant that is prepaid and this cost is delivered to the warrant holders. On a periodic basis, warrant holders are informed that some percentage of the vested ESO pool was exercised or forfeited and the weighted average intrinsic value per option was some dollar value. As a result, a percentage of the warrants is automatically exercised against all warrant holders, and the holders receive the calculated value. In this example, the data is collected over the quarter, but the exact weighted average intrinsic value (as defined in the warrant document that was "delivered" to employees) is used in the calculation. The warrant holder is informed after the fact of the expiration percentage and value.

The calculation of the "intrinsic value" per ESO is a function of how this term, "intrinsic value," is defined in the warrant offering document (e.g., (1) for ESOs that are exercised and the underlying shares are sold on the same day for cash the intrinsic value may be defined as (S-K), where S is the execution price for the shares sold and K is the exercise price; (2) for ESOs that are exercised by the employee and the employee pays the entire exercise price in cash, the plan may define the "fair market value" of the shares received upon exercise as a) the prior day's close, b) the closing price on the day of exercise, or c) the average of the high and low trading price on such day, as the case may be).

Regardless of the definition used, the intrinsic value of each exercise or lapse/forfeiture of vested options is calculated for the period in question and the weighted average intrinsic value per vested option so exercised and lapsed/forfeit is used as the intrinsic value calculation per warrant. The actual payment per warrant is (intrinsic value multiplied by fraction prepaid).

Figure 5:
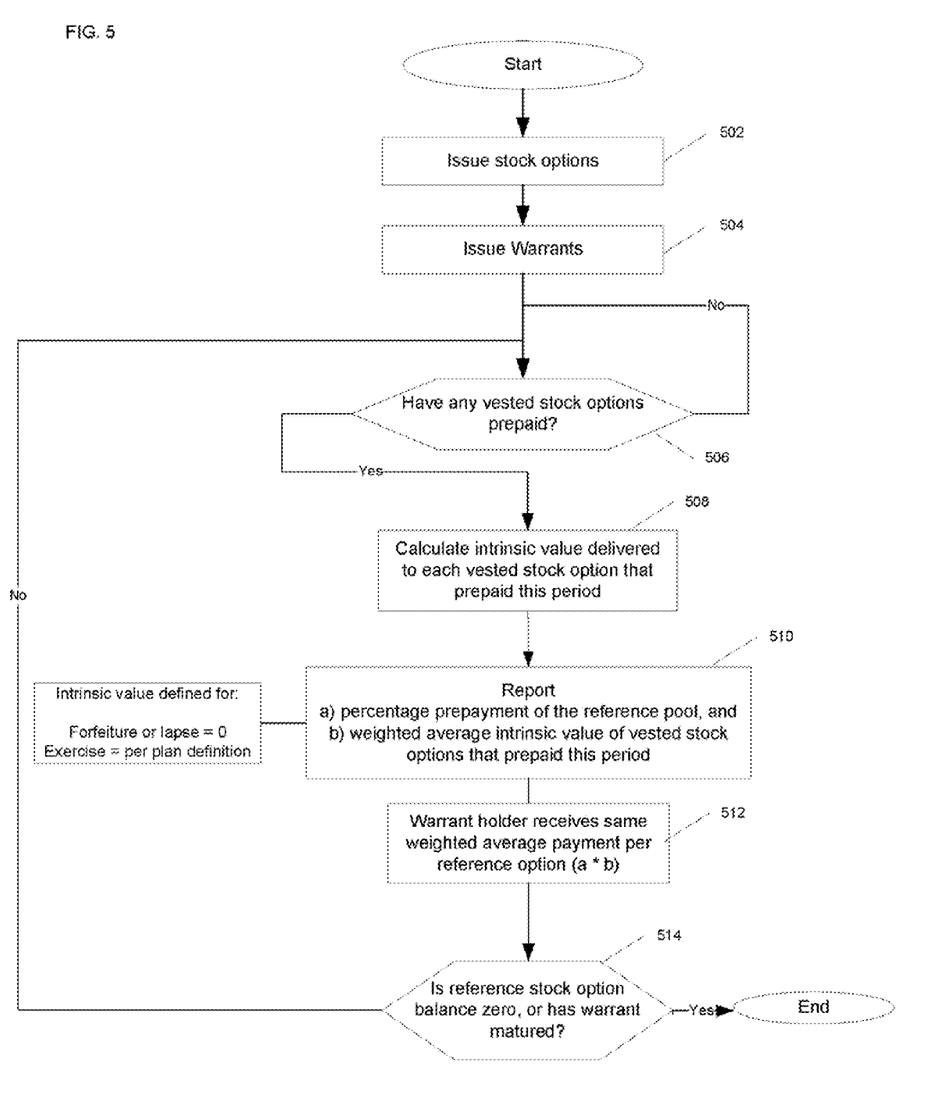
FIG. 5 illustrates steps in an example method according to one embodiment.

FIG. 5 provides an example of the steps in one such embodiment, where at step 502, company 102 issues ESOs to employees 106. At step 504, company 102 issues warrants that are purchased by warrant purchasers 104.

At step 506, system 100 determines whether any of the vested ESOs were prepaid, and if not, system 100 loops to step 506.

If at step 506, system 100 determines that any of the vested ESOs were prepaid, then at step 508, system 100 calculates the intrinsic value delivered to each vested stock option that prepaid during the period.

At step 510, system 100 reports the percentage prepayment of the reference pool and the weighted average intrinsic value of vested stock options that prepaid during the period. The intrinsic value for forfeit or lapsed options is zero, and for exercise options it is calculated per the plan definition, as described previously.

At step 512, warrant purchasers 104 receive the same weighted average intrinsic payment per option, multiplied by the prepayment fraction.

At step 514, system 100 determines whether the reference ESO balance is zero or the warrant has matured, and if so system 100 ends. If at step 514 system 100 determines that the reference ESO balance is not zero or the warrant has not matured, then system 100 loops to step 506.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A computer system for determining value of a plurality of employee stock options, the computer system comprising:
    a memory; and
    a processor coupled to the memory, the processor programmed to:
        facilitate issuance of the plurality of employee stock options to company employees on company stock, wherein the employee stock options include an exercise term, a strike price and a restriction on transfer or hedge,
        facilitate issuance of a plurality of warrants on the company stock, wherein the warrants include an amortization factor, the same or a substantially similar exercise term as the employee stock options, the same or a substantially similar strike price as the employee stock options, and provisions to periodically determine the amortization factor based on early forfeiture or exercise of the employee stock options, apply the amortization factor to the warrants and determine an intrinsic value of the warrants,
        determine the market value of the warrants at issue, and
        determine the value of the employee stock options using the market value of the warrants at issue.

2. A system according to claim 1, wherein the plurality of warrants are issued by a SEC registered offering.

3. A system according to claim 1, wherein the plurality of warrants are issued by a 144A offering.

4. A system according to claim 1, wherein the plurality of warrants are issued by a private placement offering.

5. A system according to claim 1, wherein the plurality of warrants do not include a restriction on transfer.

6. A system according to claim 1, wherein the plurality of warrants include a limited restriction on transfer.

7. A system according to claim 1, wherein the plurality of warrants include a full restriction on transfer and hedging.

8. A system according to claim 1, wherein the provision to periodically determine the amortization factor is based on early forfeiture and early exercise of the employee stock options.

9. A system according to claim 1, wherein the provision to periodically determine the amortization factor is based on vested employee stock options.

10. A system according to claim 1, wherein the provision to periodically determine the amortization factor is based on a reference pool of employee stock options.

11. A system according to claim 1, further comprising hedging the warrants.

12. A system according to claim 1, further comprising hedging the warrants after a certain period or not at all.

13. A system according to claim 1, wherein the number of warrants issued is a percentage of the number of employee stock options issued.

14. A system according to claim 1, wherein the number of warrants issued is about 5 to 15 percent of the number of employee stock options issued.

15. A system according to claim 1, wherein the provision to determine the amortization factor occurs about every quarter.

16. A system according to claim 1, wherein the provision to apply the amortization factor occurs a predetermined number of days after determining the amortization factor.

17. A system according to claim 1, wherein the provision to apply the amortization factor occurs about 30 days after determining the amortization factor.

18. A system according to claim 1, wherein the plurality of warrants further comprise a provision to settle a value due to holders of the warrants after determining the amortization factor.

19. A system according to claim 1, wherein the plurality of warrants further comprise a provision to change terms of the plurality of warrants in response to a change in terms of the employee stock options.

20. A system according to claim 1, wherein the plurality of warrants further comprise a provision to deliver a product of the intrinsic value and a fraction subject to prepayment.

21. A system according to claim 1, wherein the provision to determine an intrinsic value of the warrants is after applying the amortization factor.

* * * * *